Aug. 1, 1950 E. P. ZERE 2,517,521
PNEUMATIC TIRE AND WHEEL
Filed March 4, 1947
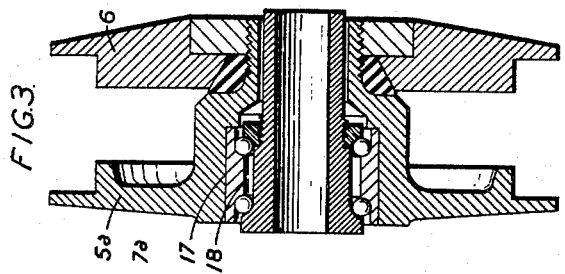
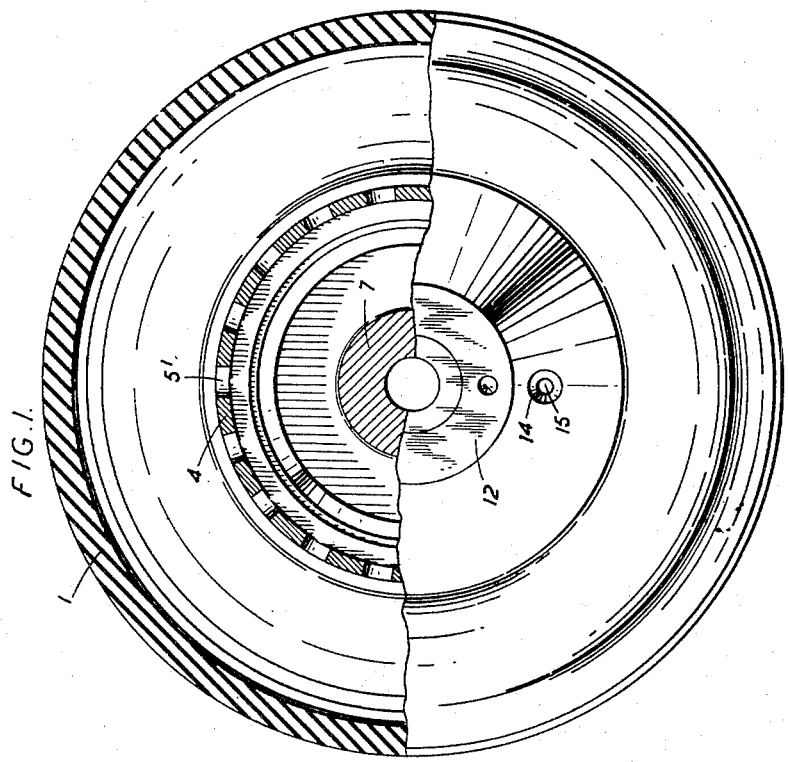
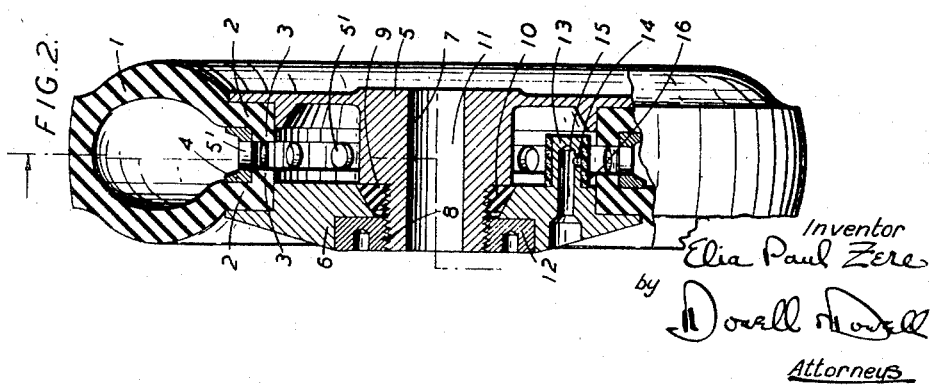
Inventor
Elia Paul Zere
by
Attorneys Patented Aug. 1, 1950

2,517,521

UNITED STATES PATENT OFFICE 2,517,521

PNEUMATIC TIRE AND WHEEL

Elia Paul Zere, Willesden, London, England

Application March 4, 1947, Serial No. 732,288
In Great Britain March 16, 1946

1 Claim. (Cl. 152—10)

This invention relates to pneumatic tires and wheels therefor and is deemed to be especially advantageous in relation to the construction of miniature tires and wheels such as may be required for model building (e. g. model cars and aircraft), comparatively light vehicles such as domestic trolleys, wheelbarrows, or in other circumstances where the required duty is of a light nature.

The principal object of the invention is to provide a construction of tire and wheel which, although inflated to some pressure above atmospheric, is devoid of the usual inner tube and is yet removable and reparable, and capable of inflation or re-inflation at will. Another object is to afford a comparatively great volumetric capacity for air in a tire and wheel assembly of which the tire only forms a lesser part. A further object is to afford a simple and robust structure, each element of which—including the pliable rubber tire proper—is extremely simple in itself.

Accordingly, the invention resides in the provision of a tire of toroidal form which is not closed upon itself but is open at its least radius, a wheel capable of supporting the tire by gripping it by its edges or beads, and preferably a spacing ring to hold these edges apart and react to the "nip" of the wheel structure axially, the tire and wheel together enclosing a common cavity into which air may be pumped through a valve or other ingress means of the wheel. Thus the volume of the air space approximates to the total volume of the tire plus wheel. The wheel is preferably constituted by two main parts in the nature of discs, means being provided to assemble and hold assembled these parts in airtight manner, and the assembly being provided with appropriate journal or other bearings.

The invention relates to the type of wheel and tire construction previously proposed, in which a tubeless tire is supported by a pair of disc-like walls forming a hub or wheel, and the interior of the tire and walls form together a single air chamber, affording a more simple, strong, and robust construction than any prior proposal known to me. Another object is to afford, practicably and cheaply, a tire and wheel assembly with a large total air capacity, compared to total size, of which the tire provides a large proportion—being in the nature of a "doughnut" type, in the sense that the "wheel" is less a wheel than a hub upon which a radially deep tire is carried. This being the preferred general form of the invention, the pressure stresses in the inelastic parts which form the hub, are less in magnitude and more easily met mechanically without complex inter-attachments, than in prior proposals.

The invention, which is defined by the claim written hereinafter, can be well understood from the examples now to be described, illustrated by the accompanying drawings. In the forms illustrated it is well adapted to the requirements of model or small-scale aircraft.

In the accompanying drawings, Fig. 1 is a face view partly in section, or with parts removed, of one embodiment according to the invention, Fig. 2 being a view at right angles to Fig. 1 and partly in section or with parts broken away. Fig. 3 is a view similar to Fig. 2 of a portion of a modified embodiment.

The invention in the example illustrated in Figs. 1 and 2, resides in the following construction. The tire 1 is a rubber moulding of substantially horseshoe sectional shape, the free edges 2 being innermost and each having an inwardly presented bead or flange 3. This tire may be unreinforced. Between the edges 2 and within the pair of opposed beads 3, a cylindrical metal rim 4 is inserted, this having holes 5' through it for lightness and air passage. The wheel consists of two main parts 5, 6 each having an internal annular shoulder on which the beads 3 rest as shown. The main part 5 is a disc with an axial stalk or stem 7 to extend across the wheel, the extremity of which stalk is threaded externally as at 8 and presents a shoulder 9 to seat a pliable rubber sealing ring or washer 10. This main part 5 is like a mushroom in shape; and is axially bored as at 11 to afford a journal bearing for a spindle or axle not shown. The complementary part 6 is a second dished disc, adapted to fit against the washer 10 this being passed over the thread 8 of the stalk 7. A nut 12 on the thread 8 draws the second disc 6 tight against the washer 10. The peripheral margins of the two discs 5, 6 draw up against the outside of the tire walls to nip the latter between the discs and the internal metal rim 4, in airtight manner. The whole is so dimensioned that tightening up the nut 12 simultaneously draws up the edges of the discs against the tire and draws up the second disc 6 against the washer 10, sealing the wheel at this point. The provision of the rubber sealing washer 10 prevents metal to metal contact between the inner margin of the disc 6 and the shoulder 9 and the yielding of the washer permits proper sealing of the tire edges between the rim 4 and the peripheral margins of the discs 5 and 6 when the nut 12 is tightened up. A valve is provided in one of the discs i. e. the disc 6, said valve being in the form of an internal cylindrical boss or spigot 13 with a radial bore 14 joining a blind axial bore 15 opening on the outside of the disc. On the spigot 13 a length of cycle valve tubing 16 is fitted. Any suitable pump connection may be provided, or merely a seat at the mouth of the bore 15, to enable the nozzle of an inflator to be held in sealed connection with it.

The discs 5, 6 are externally convex for preference, and in this they present (with the tire) an appearance agreeably like an aircraft wheel. In the figures however only the disc 6 is thus shown. Since both wheel and tire are inflated it will be evident that a much greater air capacity is afforded than resides within the tire alone.

The wheel parts may in the main be made by die-stamping, casting, pressing, or machining, so that the construction lends itself to economic quantity production methods.

In the modification shown in Fig. 3 the wheel and tire combination is in essential respects the same as that illustrated in Figs. 1 and 2 except that the axial stalk or stem 7a of the disc 5a is enlarged as at 17 to accommodate a ball bearing unit 18 which may be pressed tightly therein. The tire 1 and metal rim 4 of Fig. 3 are omitted.

What I claim is:

A miniature tire and wheel construction for light duty purposes such as herein referred to comprising in a tire of toroidal form open at its least radius and having free edges with inwardly presented beads, a perforated metal rim located between said edges and closely surrounding the beads, a wheel disc member having an axial stalk or stem which extends across the wheel and has a shoulder, the extremity of which stalk is threaded externally, a pliable annular washer seated against said shoulder, another wheel disc member adapted to be passed over the thread of the stalk aforesaid and a nut on the thread adapted to draw the two disc members towards each other and nip the free edges of the tire and the washer between them.

ELIA PAUL ZERE.

REFERENCES CITED

The following references are of record in the file of this patent:

UNITED STATES PATENTS

| Number | Name | Date |
|---|---|---|
| 1,017,973 | Horner | Feb. 20, 1912 |
| 1,023,454 | Black | Apr. 16, 1912 |
| 1,394,492 | Goodwin | Oct. 18, 1921 |
| 1,470,938 | Semery | Oct. 16, 1923 |
| 1,481,484 | Rieske | Jan. 22, 1924 |